(12) United States Patent
Oguzata (10) Patent No.: US 11,282,292 B2
(45) Date of Patent: Mar. 22, 2022

(54) METHOD BASED ON UNIQUE METADATA FOR MAKING DIRECT MODIFICATIONS TO 2D, 3D DIGITAL IMAGE FORMATS QUICKLY AND RENDERING THE CHANGES ON AR/VR AND MIXED REALITY PLATFORMS IN REAL-TIME

(71) Applicant: Mert Levent Oguzata, Ankara (TR)

(72) Inventor: Mert Levent Oguzata, Ankara (TR)

( * ) Notice: Subject to any disclaimer, the term of this patent is extended or adjusted under 35 U.S.C. 154(b) by 0 days.

(21) Appl. No.: 17/283,963

(22) PCT Filed: Oct. 14, 2018

(86) PCT No.: PCT/TR2018/050594
§ 371 (c)(1),
(2) Date: Apr. 9, 2021

(87) PCT Pub. No.: WO2020/081017
PCT Pub. Date: Apr. 23, 2020

(65) Prior Publication Data
US 2021/0335051 A1    Oct. 28, 2021

(51) Int. Cl.
| | |
|---|---|
| G06T 19/20 | (2011.01) |
| A63F 13/52 | (2014.01) |
| G06T 1/20 | (2006.01) |
| G06T 13/20 | (2011.01) |
| G06T 15/50 | (2011.01) |
| G06T 19/00 | (2011.01) |

(52) U.S. Cl.
CPC .............. *G06T 19/20* (2013.01); *A63F 13/52* (2014.09); *G06T 1/20* (2013.01); *G06T 13/20* (2013.01); *G06T 15/50* (2013.01); *G06T 19/006* (2013.01); *A63F 2300/8082* (2013.01); *G06T 2200/24* (2013.01); *G06T 2210/32* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | |
|---|---|---|
| 9,177,418 B1 | 11/2015 | Bawden et al. |
| 2015/0248503 A1 | 9/2015 | Glunz et al. |
| 2017/0365102 A1 | 12/2017 | Huston et al. |
| 2018/0115743 A1 | 4/2018 | McLoughlin et al. |
| 2020/0037043 A1* | 1/2020 | Phillips ............ H04N 21/26258 |

FOREIGN PATENT DOCUMENTS

WO    2012153290 A1    11/2012

* cited by examiner

*Primary Examiner* — Robert J Craddock
(74) *Attorney, Agent, or Firm* — Bayramoglu Law Offices LLC (57) ABSTRACT

A system and a method allowing to make changes on a desired model and/or a scene by converting models and/or scenes in different formats into a unique format and by integrating them into Augmented Reality and Virtual Reality/Mixed Reality and other emerging technologies and enables to be displayed of the changes by other users simultaneously are provided.

4 Claims, 7 Drawing Sheets

METHOD BASED ON UNIQUE METADATA FOR MAKING DIRECT MODIFICATIONS TO 2D, 3D DIGITAL IMAGE FORMATS QUICKLY AND RENDERING THE CHANGES ON AR/VR AND MIXED REALITY PLATFORMS IN REAL-TIME

CROSS REFERENCE TO THE RELATED APPLICATIONS

This application is the national stage entry of International Application No. PCT/TR2018/050594, filed on Oct. 14, 2018, the entire contents of which are incorporated herein by reference.

TECHNICAL FIELD

The invention relates to a system and a method that allows to make changes on the desired model and/or scene by converting these models and/or scenes which are in different formats into a unique format and by integrating them into Augmented Reality and Virtual Reality/Mixed Reality and other emerging technologies and also enables to be displayed of those changes by other users simultaneously.

BACKGROUND

Augmented Reality, Virtual Reality and Mixed Reality etc. technologies are being used in many areas especially in industry, defense, education, health, gaming sector depending on the rate of increase in the number of business lines operating today and also are being developed according to the requirements of said areas. Three-dimensional models can be placed in Inside of the Virtual scenes that can be achieved in a variety of ways, through a number of other emerging technologies, including Augmented Reality, Virtual Reality and Mixed Reality or placed in the real-world environment without any scene.

Augmented Reality, Virtual Reality and Mixed Reality technologies of the which belongs to the known state of art are described in detail in US20170365102A1. Within the scope of these technologies, there are many systems for creating content and presenting it to the user. In these systems, at first it is necessary to make 3D modeling of the models and/or scenes in different formats to be used for AR/VR etc. Technologies. And after that the file that is formed after the modeling should be converted to be functionalized in AR/VR technology. Then the models and/or scenes in different formats that is modeled as 3D should be transferred to a different system to be displayed with AR/VR technology.

The technical details of the procedures of integrating models and/or scenes into a system implementing AR/VR technology in the known systems are explained in patent U.S. Pat. No. 9,177,418B1 and US20150248503A1 and number of known applications/techniques are described. Although there are systems capable of converting multiple formats into a 3D format that is suitable for processing in AR/VR technology, these systems do not have a comprehensive format recognition and conversion capability so different systems need to be developed for different formats.

In the Known Status of the art, the models and/or scenes in different formats are converted to a 3D format that is suitable for processing in AR/VR technology after modeling and then they are transferred to the system to be used in AR/VR and other similar technologies. After these procedures, if any changes are requested on the 3D models and/or scenes, the whole process, briefly summarized above, 3D modeling, converting of the 3D models and/or scenes to be used in AR/VR technologies, transferring to the system etc. need to be started from the beginning as if a new model and/or scene was going to be created and the steps of the whole process need to be repeated one by one.

For example, a user wants to place a table in the living room of his home but also would like to see the table with an increased reality technology before the purchase considering variables such as its position, size and the harmony of the colors with the furniture. In this case, the salesman needs to upload images of the table from every angle to the computer aided system and the 3D model of the uploaded image format should be made for it to be able to used in the AR/VR etc. Technologies and then this 3D model should be converted to a format which will be used in the AR/VR Technologies. After that the converted format should be processed and transferred to the system. However, if the consumer wants to see a color of the table that is not registered in the existing AR/VR system, all the above-mentioned steps of the process will need to be done one by one from the beginning. In other words, the process of the uploading images of the table from every angle to the computer aided system by AR/VR system provider, making the 3D model of the uploaded 2D image to be used in the AR, converting the 3D model to a format which will be used in the AR/VR Technologies, processing the converted format and transferred to the system has to be repeated. The same process stands even for minor changes, such as reducing or enlarging the size of the created AR/VR image.

AR/VR technology which is being used actively in many different areas of life, causes serious labor and time loss due to the fact that existing systems do not have the capacity to change the AR/VR images quickly and the changes cannot be synchronized to the system and the users of the system simultaneously.

As can be seen the existing systems of the Known Status of the Art lack the qualifications to achieve maximum level of efficiency through revealing the true potential and capacity of Augmented Reality and Virtual Reality/Mixed Reality and other emerging technologies; in the sectors where such technologies are heavily used.

SUMMARY

The invention relates to a system and a method that allows to make changes on the desired model and/or scene by converting these models and/or scenes which are in different formats into a unique format and by integrating them into Augmented Reality and Virtual Reality/Mixed Reality and other emerging technologies and also enables to be displayed of those changes by other users simultaneously.

According to our present invention, after modelling the models and/or scenes in 3D format at first, it is necessary to convert the models and/or scenes in different formats that are desired to be used in Augmented Reality and Virtual Reality/Mixed Reality and other emerging Technologies into original and fixed data which is compatible with AR/VR technology. Then, the data compatible with converted AR/VR technology has to be transferred to the system. The moment when this process is completed, the subject system enables its users with opportunity to process the unique data which is compatible with the completed integration of AR/VR technology, in this way it allows changes in the desired model and/or scene and allows these changes to be viewed by all users at the same time of the changes synchronously.

When changes are requested according to the variables around the model and/or scene that is displayed through AR/VR etc. technologies or due to the scenario it is in, it is inevitable to change the size, color and original characteristics of it. In such a case, in order to make a change over a model and/or scene displayed via AR/VR etc. technologies, all of the processes described/listed in the Known Status of the Art need to be done all over again/re-made, thus entire process must be repeated for any changes.

Thanks to the technical solution bringing out of the present invention, models and/or scenes that are intended to be used in AR/VR etc. technologies are converted into unique and fixed data after modeling. On the Images rendered viewable in AR/VR technologies, changes can be made without the need for a new modeling in terms of additions to converted original and fixed data and also very comprehensive elements such as position, scale, animation changes, light characteristics, color, brightness and also without the need for conversion of the 3D modeling to the format that will be used in the VR/AR etc. technologies and after that it can be directly transferred into the AR/VR system.

The aforementioned change results as soon as the change is made. In other words it is automatically synchronized to the AR/VR system. In this way, when changes are made in the desired model and/or scene, the changes that have been made can be displayed simultaneously as of the moment of change by all the users.

With the present invention, speed and harmony with the rapidly changing and evolving ideas is ensured among the Augmented Reality and Virtual Reality/Mixed Reality and other emerging technologies, which are used in many areas around the world. By eliminating the long and complex process that needs to be followed when changes are made in the images created to be used within the scope of these Technologies, it is intended for the changes to be made in a short period of time and achieving results as of the moment of change so in that way loss of time, space, work force is prevented and thus human beings are able to use said technology in maximum efficiency.

Thanks to the present invention, thanks to the unique conversion format; adherence to the templates that are previously transferred to the system in the AR/VR technology is eliminated, the new image and elements can be included in the AR/VR image in a very short time no matter which format they are in, and the system can present it visually to the user by processing the added image immediately. This, of course, enables the creativity to transform directly into the reality and makes a serious contribution to the industry and the entire field where AR/VR technology is used.

It has been found that the known systems do not have the technical features obtained by the present invention and also know systems do not operate with the same efficiency as the present invention and fall behind the present invention.

BRIEF DESCRIPTION OF THE DRAWINGS

Description of Images

DESCRIPTION OF PARTS AND ENTITIES AS REFERRED IN THE IMAGES AND CLAIMS

100—A computing device.
101—Memory unit (RAM, or ROM).
102—Central Processing Unit (CPU).
103—Operating System.
104—Graphical Processing Unit (GPU).
105—Applications that are developed for the computing device.
106—Game/Graphics engine.
107—AR/VR/Mixed Reality Platform SDK (Software Development Kit).
108—Metadata Editor.
109—Original Metadata File Format.
110—Hard-disk drive disk storage unit.
111—External drive storage unit.
112—Input units such as keyboard, mouse, and touch screen etc.
113—Output units as internal or external screen, head mount display (HMD) etc.
114—Network and connection points.
115—Other computing devices
201—Mesh and mesh hierarchies control panel.
202—Animation control panel.
203—Material control panel.
204—Lighting control panel.
205—Interactions and scenarios panel.
206—Transforms control panel.
300—Scene.
301—Metadata defining the scene.
302—Modified metadata of the scene.
303—Metadata defining only the changes in the scene.

Detailed Description of the Embodiments

Technical Details of the Invention

Figure 1:
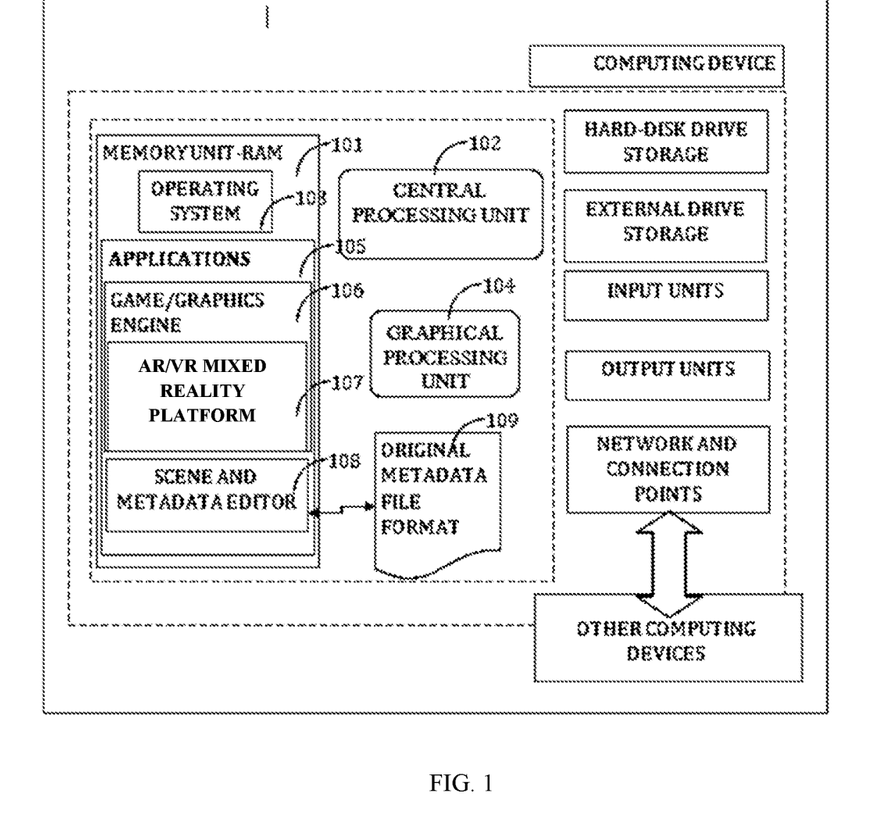
FIG. 1—An exemplary device configuration suitable for the invention

The invention system infrastructure as described in FIG. 1 executes collaboratively on a computing device (100), convenient to work with AR/VR/Mixed reality software kits, in a game/graphics engine (106). As a basic configuration; this computing device (100) consist of one or more memory units RAM (101) suitable for system requirements, a central processing unit CPU (102) convenient for the invention system to work, an operating system OS (103) that is compatible with this CPU, a graphical processing unit GPU (104), one or more applications that are developed specifically for this operating system (103), one of this application that is a game/or graphic engine (106); on an infrastructure communicating with AR/VR/mixed reality platform software development kits—SDK (107), a scene (300) which is modified and visualized by the metadata editor (108) that the modifications and results are then transferred in an original metadata file format (109) to and rendered by the graphics/game engine (106). Computing device (100) also uses at least one or more of the devices as follow; a hard-disk drive storage HDD (110) or an external drive storage unit (111) to execute file transfers, input units (112), output units (113). The communication between other computing devices (115) is obtained by network and connection points.

Figure 3:
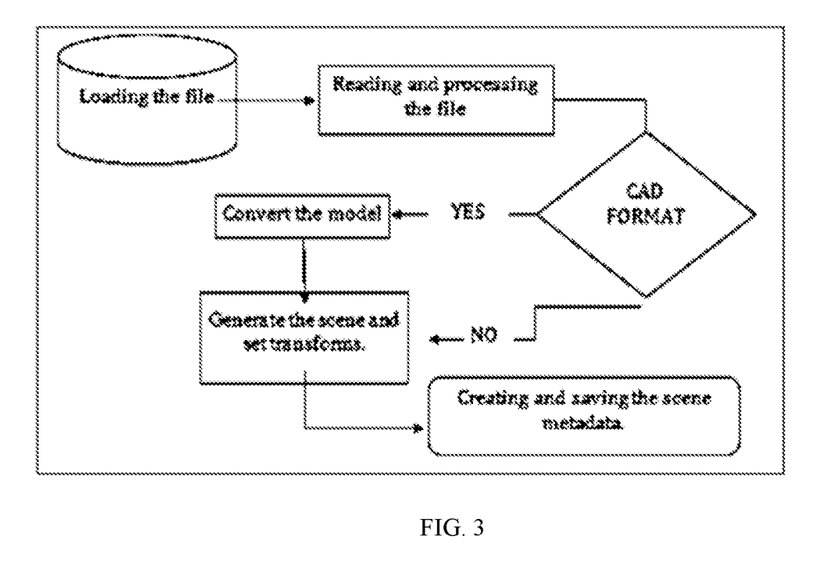
Figure 4:
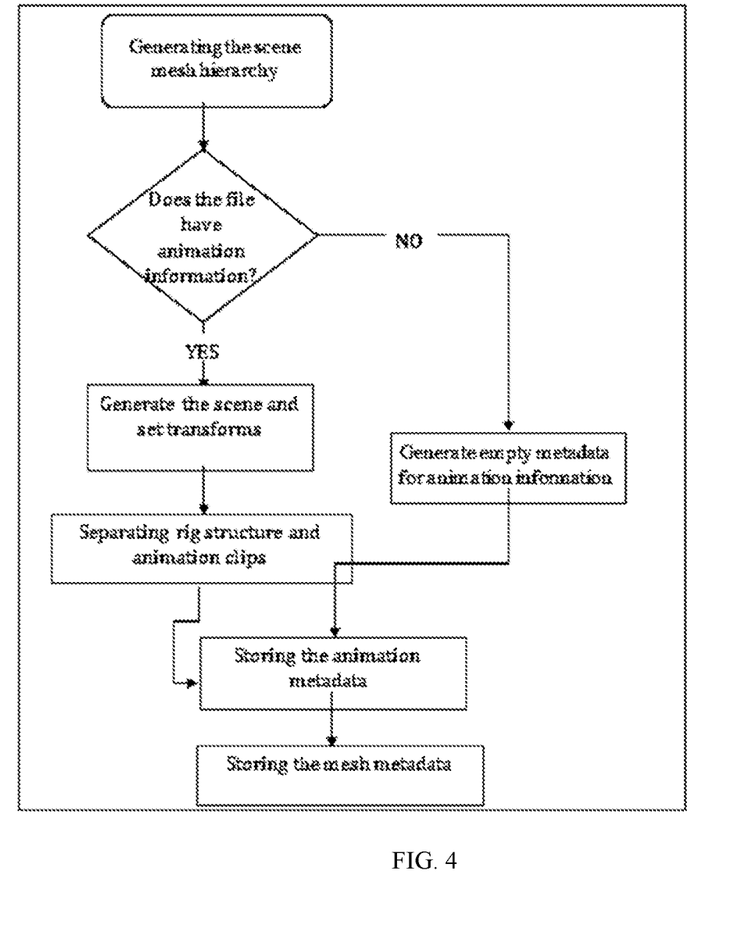
FIG. 4—A diagram representing the creating of the mesh hierarchy and saving the original metadata file format with animation information.
Figure 5:
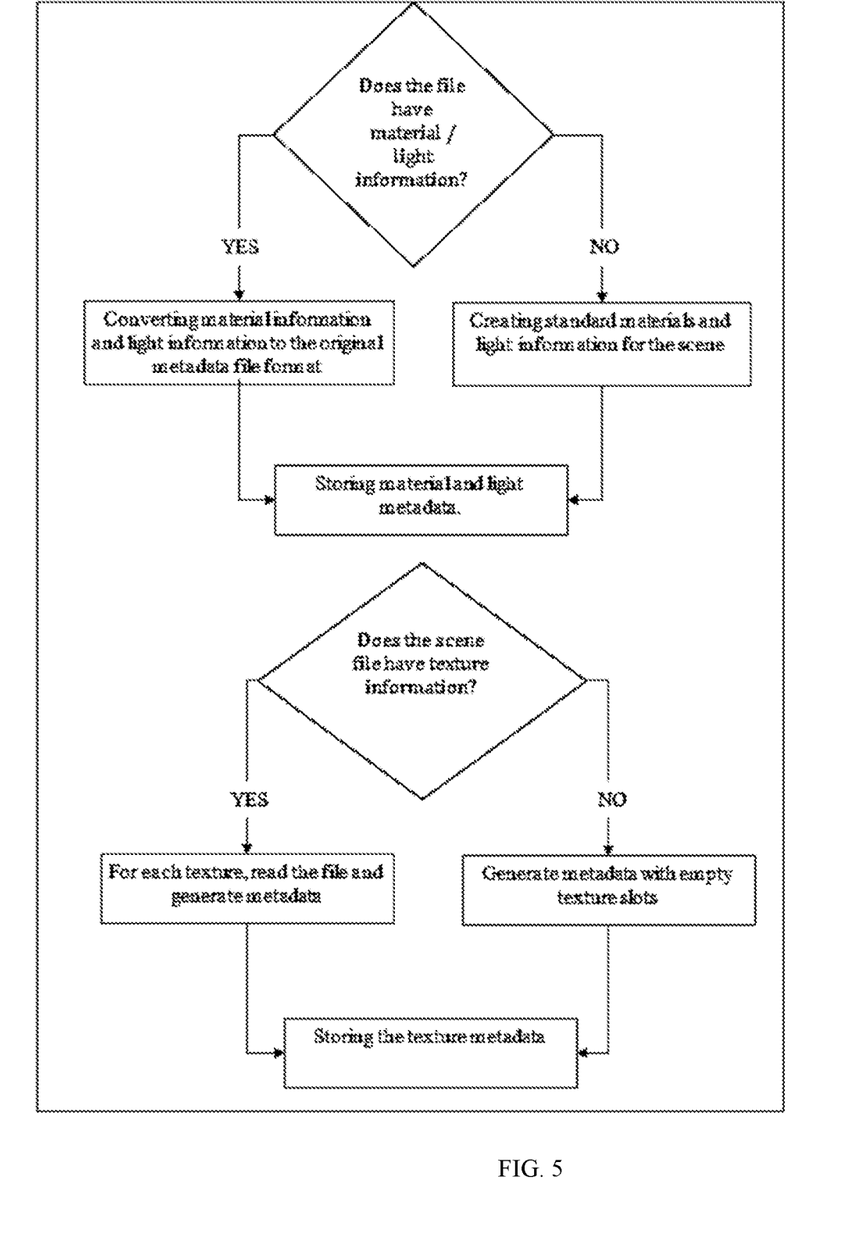
FIG. 5—A diagram of saving the original metadata file format including materials, texture and light information.

First and foremost if a three dimension—3D content which within its original format is not suitable to represent and rendered in AR/VR and mixed reality platform, is imported to the scene (300), file is processed and converted to our original metadata file format (109) which is designed to work with our system conveniently. If the content is in a suitable file format to use with, the properties of the scene and properties of the entities in the scene is read and appended to the metadata defining the scene (301). A sample procedure is shown in FIG. 3. As described in FIG. 4 and FIG. 5; information about such as mesh, object, material, texture, animation, light contents in the metadata defining the scene (301) is determined and recorded by the metadata editor (108). Utilizing this step of the process, all required properties are saved in the original metadata file format (109) without depending on the content format. Each data kept in the mesh hierarchy is matched with their unique ID by the system along with the sub metadata packets (mesh, object, material, texture, animation, and light information etc.) in convention with the original metadata file format (109) during this conversion and recording processes, which makes the records of change easier. That way even the file or object name changes on the file, the metadata that is saved on the computing device (100) and other computing devices (105) can be compared and matched accordingly and the changes can be recorded.

After this primary record is made, each changes on the metadata defining the scene (301), can be compared, modified and edited as a whole, or as defining one or more parts of the whole. The modifications made by user on computing devices (100), are compared against the metadata defining the scene (301), and then only the modified metadata of the scene (302) is filtered and published to the other computing devices (115) via the network and connection points (114). The modified metadata of the scene (302) defining the scene as a whole, or defining the parts of the scene that is published then is read by the other computing devices (105), modified parts are determined and metadata defining only the changes (302) are processed and rendered in the game/graphics engine with the communication on AR/VR and mixed reality platform SDKs (107).

Metadata editor (108) is a software that can use graphics processing unit (106) on the computing device (100) directly or via game/graphics engine (106), and is able to transfer information between game/graphics engine (106) and AR/VR and mixed reality platform SDKs (107). With this metadata editor (108) content saved in specific file formats, scene (300) and objects can be visualized and can be edited in, or a new content or scene (300) can be imported into an empty scene (300), then this content can be modified and published to AR/VR and mixed reality platforms.

Figure 2:
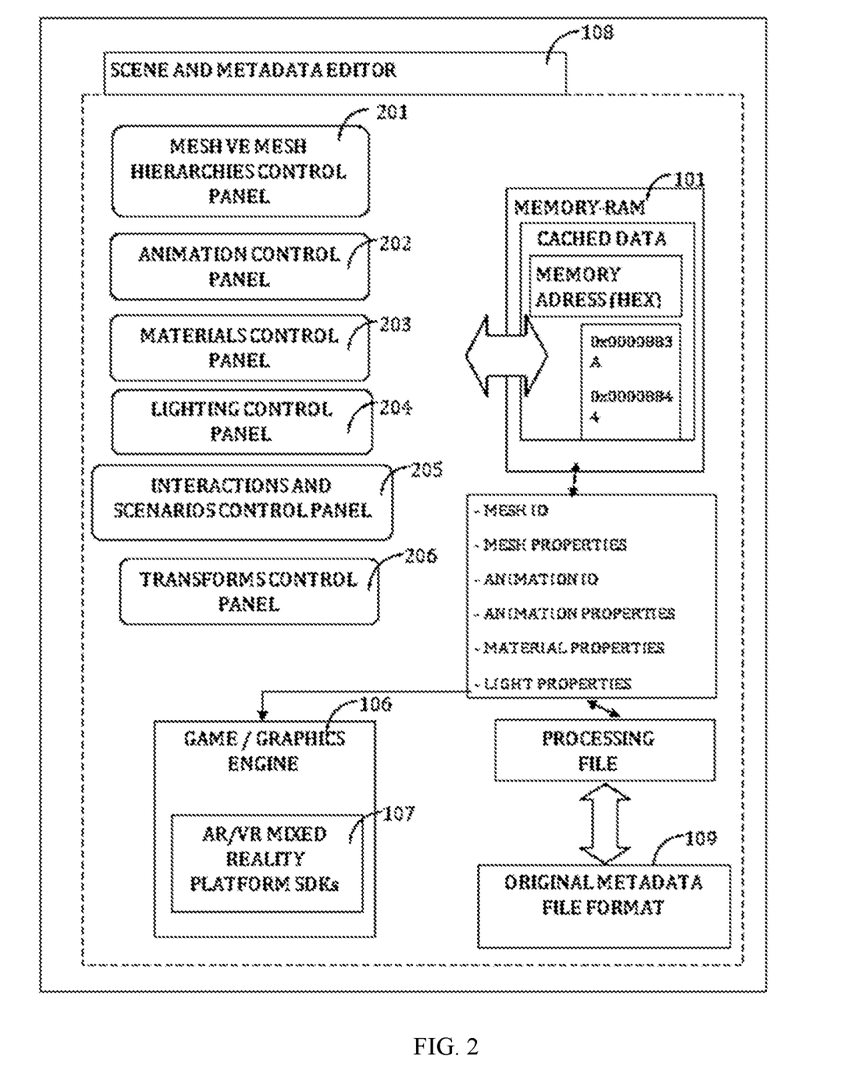
FIG. 2—An illustration of a process flowchart of the metadata and the scene editor FIG. 3—A basic diagram of creating the scene and saving the metadata file.

Metadata editor (108) includes but not limited to, a mesh and mesh hierarchies control panel (201), animation control panel (302) which has animation controls and also lists the animations in the scene (300), a material control panel (203) which has materials and a controls for manipulating the material properties, a lighting control panel (204) which has lights and controls for light properties, an interactions and scenarios panel (205) and a transforms controls panel (206) which is used to modify properties of objects in scene (300). (FIG. 2)

Mesh and mesh hierarchies control panel (201), gives user the ability to control the operations such as listing and selecting the 2D-3D objects and other items in the scene (300), adding new items or removing, activating or deactivating extensions.

Animation control panel (202) is a control system that contains the operations like listing and selecting the animations, adding new animations or removing, editing the interactions between objects and animations other animation controls such as playing stop and changing the current frame of the animation.

Material control panel is control system that contains the following but not limited to, the materials appended to the objects in the scene (300), controls for editing and changing the material properties.

Lighting control panel (204) is a control system that includes but not limited to, the interactions that enables user to add, remove lights, change properties and types of lights in the scene (300).

Interactions and scenarios panel (205) is a control system that provides controls to edit and author the interactions in AR/VR and mixed reality platform. Interactions and scenarios panel (205) includes an interface and/or a simple node-based system that provides visual-scripting methods to manage interactions.

Transforms control panel (206), provides the ability to manage position, rotation and scales of the metadata packets of models, meshes, lights etc.

Mesh and mesh hierarchies control panel (201), contains a list of 3d models or tree view of meshes of objects that is opened and stored on the memory unit (101). In this list, every item refers to a pointer on the memory, which traces every change on the object to its reference on the memory, and also visualizes the object pointing to memory while updating accordingly. Unique ID paired with the selected mesh item, traces the changes on information such as materials, transforms, lights and animation; processes the modifications to game/graphics engine (106) and image is rendered.

Animations that are included in that is currently open scene (300) or are imported later via animation control panel (202), is matched and recorded by their IDs and added to the animations list. Time, frames and bone system of every animation is cached on the memory. Modifications made to the animations and changed controls are processed to game/graphics engine (106) and rendered.

Every material that is imported while processing the file, added later via files or selected from a predefined material gallery is listed with the controls that manages the properties of the material. Each material is cached on memory with an ID and changes made via control panel is then processed to game/graphics engine (106) and rendered.

Lighting control panel (204) stores all lighting information matched by their unique IDs on the scene which is imported while processing the file or later added by user via control panel. Changes made via lighting control panel (204) is processed to game/graphics engine (106) and rendered.

Interactions and scenarios panel (205) stores the records of the objects in the scene and interactions between the entities and interfaces created by user. Each programming item or predefined operation on this panel, other user controls or results that is calculated from hardware inputs, affects and changes one or more objects' addresses and metadata cached on the memory. These modifications then processed to game/graphics engine (106) and rendered. User can manage and present the following but not limited to, the sequence of content to be shown, the order of the activation of animations, the interface and information presented to the final user by designing these interactions with graphical user interfaces or visual programming.

Transform control panel (206) stores the pointer to the cached mesh and light data on the memory. By which the modifications to the position, scale and rotation to the object is traced and processed to the game/graphics engine (106) and rendered.

Modifications are made by control panels referred above are stored on the hard disk drive storage unit (110) or external drive storage unit (111) in the original metadata format (109) paired to the ID's they represent. If the modifications to be made on metadata defining the scene wanted to be published, metadata defining only the changes in the scene (303) cached on the memory is then published via the network and connection points (114). This data is downloaded by the other computing devices (115) and processed by the metadata editor (108) executes on these devices and is updated.

Figure 6:
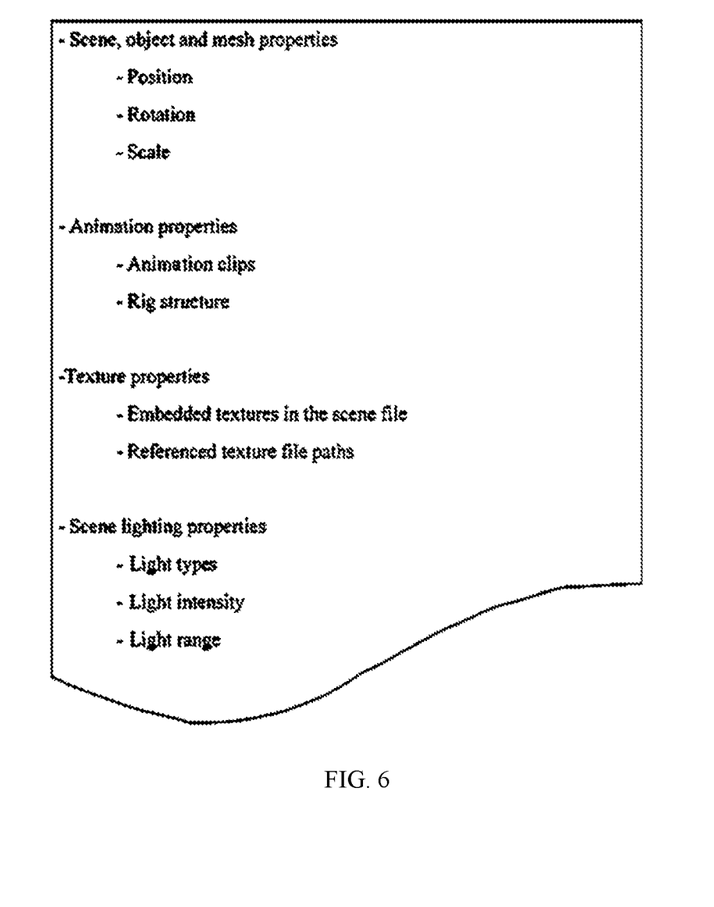
FIG. 6—An exemplary content representing the original metadata file format with materials and scene information.
Figure 7:
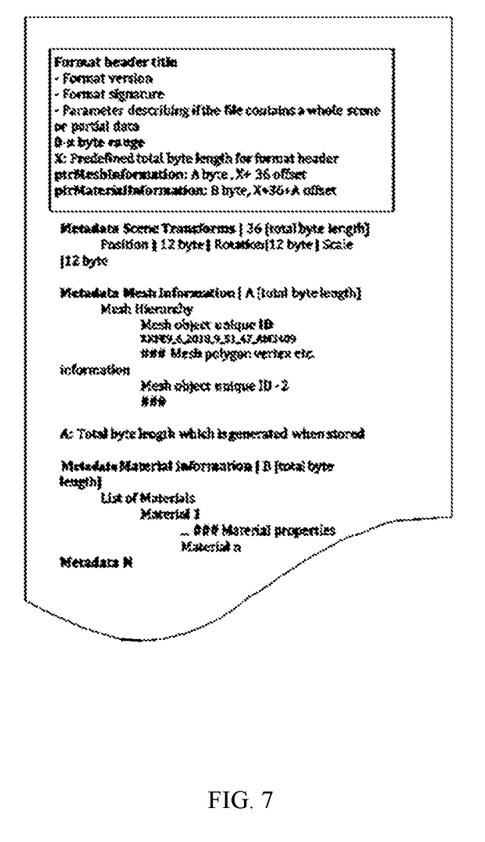
FIG. 7—An exemplary content, representing the binary byte view of the original metadata file format.

Below table representing the original metadata file format (109) is designed specifically to provide a fast and easy method providing the ability to store all the metadata that represents the 3D scene and content, to compare and match the modifications and to update the scene as needed. With different versions of the format in this metadata, data types and sections of the metadata packets can be increased or modified without losing the information on the older version of the file format.

What is claimed is:

1. A method based on unique metadata for constructing, creating and making direct modifications to 2D, 3D digital image formats and displaying changes on Augmented Reality/Virtual Reality (AR/VR) and mixed reality platforms in real-time, consisting of the steps of:
   i. constructing a scene, on a computing device; wherein the computing device stores all information on the scene in an original metadata file format,
   ii. in case a new content created with or without an external image software is intended to be imported and added into the scene even if the new content is not in the original metadata file format, reading and processing the new content by a metadata editor in order to be converted to the original metadata file format and merged with existent information in the scene,
   iii. determining the new content of a file to be imported to the scene, such as meshes, materials, textures, animation, light and other entities, splitting the new content to sub metadata packets and storing the new content in a binary format by the metadata editor to obtain a stored new content,
   iv. reading the stored new content in the scene with a central processor unit (CPU) and rendering and displaying the stored new content with a graphical processing unit (GPU) on graphics/game engine, communicating with AR/VR and mixed reality platform software development kits (SDKs), and publishing the stored new content to other computing devices via network and connection points, and
   v. reading and processing published new data containing a modified metadata of the scene by the metadata editor on the other computing devices and rendering and displaying a final scene on the AR/VR and mixed reality platforms.

2. The method according to claim 1, wherein
   i. in case the new content is added or a change is made on the new content on the scene, comparing the modified metadata of the scene with a metadata defining the scene, determining modifications by the metadata editor and storing a metadata defining only changes in the scene on a storage unit,
   ii. publishing the metadata defining only the changes or the new content in the scene via the network,
   iii. downloading the metadata defining only the changes or the new content in the scene by the other computing devices, reading and processing the metadata by the metadata editor on the other computing devices, determining and processing modifications on the sub metadata packets by the metadata editor, and computing, rendering and displaying the final scene on the AR/VR and mixed reality platforms.

3. The method according to claim 2, wherein the metadata on a current scene or the final scene stored in the other computing devices are interacted with modified, added or removed via, control systems interfaces like a mesh and mesh hierarchies panel, an animation control panel, a material control panel, a lighting control panel, interactions and scenarios panel or transforms control panel by using input units on a device without requiring an information network stream from a publisher computing device.

4. The method according to claim 3, wherein both the other computing devices and a metadata editor software operate separately and construct, create and make the direct modifications to 2D, 3D digital image formats and displaying the changes on the AR/VR and mixed reality platforms in real-time separately.

* * * * *